INVENTOR.
S. A. Young

United States Patent Office 2,966,924
Patented Jan. 3, 1961

2,966,924

VALVE AND ADJUSTABLE ESCUTCHEON MEANS THEREFOR

Stephen A. Young, R.D. 4, Monticello, Ind.

Filed Nov. 17, 1958, Ser. No. 774,429

2 Claims. (Cl. 137—359)

This invention relates to plumbing fittings or fixtures and more particularly to the construction of trim used in association therewith.

In the plumbing fixture art, one of the real problems which is faced by both the plumber and often times the plasterer, is the location of the fittings in the wall, with relationship to the finished surface of the wall.

In the usual roughing in, the plumber positions the body of the fixture in the wall and does not apply the trim thereto until some later time after the plasterer has performed the necessary wall coating operation. Many times the fitting or fixture is not ideally positioned in the wall and as a result the problem of applying the trim thereto is rather complicated possibly because of the variation in thickness of the wall as well as the variation in location of the fitting within the wall or other commonly known problems existing with regard thereto.

It is therefore a quite necessary circumstance in many cases to provide a substantial range of adjustments for the finish trim, particularly having the escutcheon provided therefor in mind and it is necessary to fasten the escutcheon with regard to the fitting so that it will not be moved unnecessarily during operation of the fixture or fitting for admitting water to the place of final use. The primary problem in this connection is raised where bath and shower fittings are involved and this invention contemplates the provision of novel means for accommodating the application of the trim to such bath and shower fixtures within a very wide range of location of the body of the fitting itself.

It is therefore a principal object of this invention to provide trim which is adjustable with regard to a bath or shower fitting, which trim will accommodate for the location of the body of the fitting within a wide range in the wall and provide further for mounting the escutcheon on the body so that it is fixed with regard thereto.

Another object of the invention is to provide novel means for effecting adjustment of an escutcheon with regard to a body and thus make possible a wider range of location of the body of the fitting in the wall and yet have the same operable and neat looking when the same is in use.

Yet another object of the invention is to provide trim for bath and shower fittings or the like which trim includes handle means which enclose the stem and in conjunction with suitable adjusting instrumentalities provided for the escutcheon, maintain the stem in completely concealed condition irrespective of the operating position of such stem in admitting the water to the tub or shower as the case may be or in regulating the operation of such fittings.

Another object of the invention is to provide modified forms of trim means which will facilitate location of the body of the fitting in a wall in various locations and yet maintain the stem in concealed condition as well as provide for adjustment of an escutcheon with regard to the fitting to accommodate for various thicknesses of walls without interfering with the operating characteristics of the fitting as a whole.

Other and further objects of the invention will be understood from a consideration of the specification appended hereto and shown in the drawing wherein.

Figure 1:
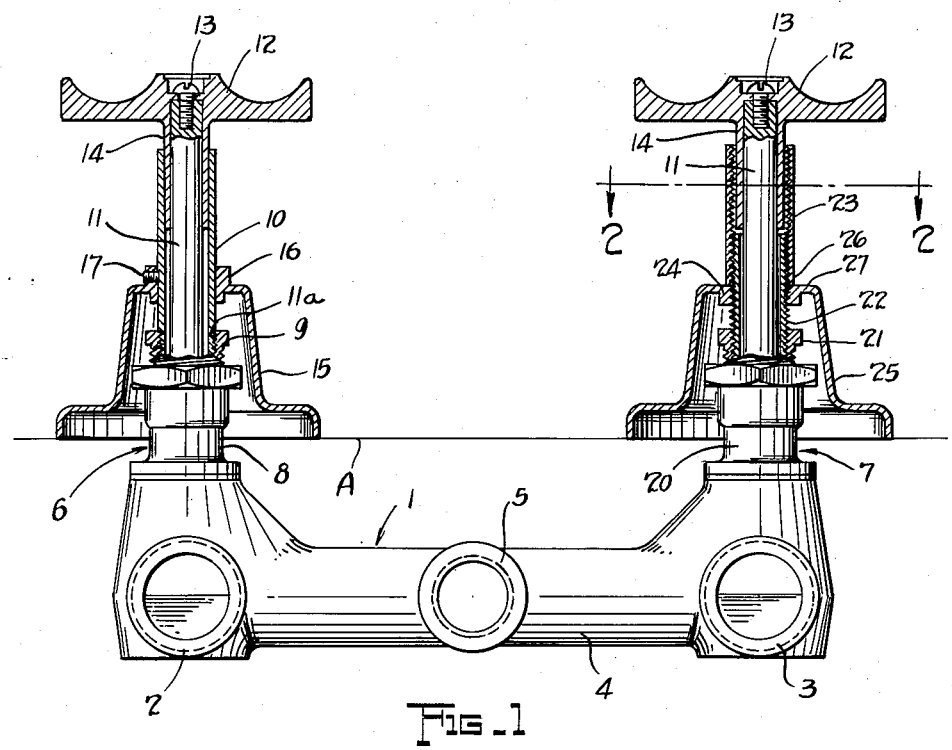
Figure 1 is an elevation view of a fitting of the tub and shower type having at the left hand portion thereof one form of the invention and at the right hand portion another form of the invention.
Figure 2:
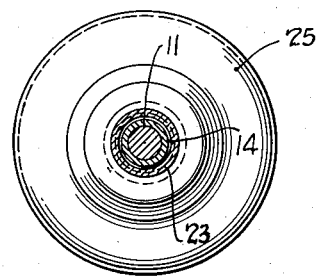
Figure 2 is a sectional view taken about on the line 2—2 of Figure 1 looking in the direction of the arrows.

Referring now to Figure 1, a tub and shower fixture, or a tub or shower fixture as the case may be is generally denoted 1 having the inlets at 2 and 3 and mixing chamber at 4 which leads to a tub opening or outlet 5.

In order to control the admission of water into the mixing chamber 4, suitable valve units such as 6 and 7 are provided each including the same working parts such as a bonnet 8 in which is threadedly engaged a stuffing box nut 9, the nut commonly being availed of to press a gasket into the upper end of the bonnet 8, the bonnet 8 in each case being removable and threadedly engaged with the body 1 in accordance with generally conventional concealed fixture manufacture.

Dealing initially with the left hand unit in Figure 1, there is disclosed the nipple unit denoted at 10 which is provided with threads on its outer lower end at 11a which engage with co-mating threads in the interior of the stuffing box nut 9, this nipple unit 10 consisting of an elongated tubular member which is designed to have its outer surface plated with chromium or the like so as to present a neat appearance.

Operatively mounted within the bonnet 8 and extending into the body 1, is the stem 11 provided with suitable parts on its inner end to control the flow of water through the opening 2 into the mixing chamber 4, the stem in turn having mounted on its outer end a suitable handle 12 engaged with the stem so as to be removable therefrom by means of a screw 13.

The handle 12 previously mentioned, includes an extension 14, integrally formed with the handle 12 and of relatively long form so as to extend downwardly inside the nipple unit 10. The exterior of the member or portion 14 is suitably plated so as to present a neat pleasing appearance and obviously rotation of the stem 11 by the handle 12 will in accordance with usual practice move the stem inwardly and outwardly of the bonnet 8. This type of movement which is in many cases of relatively great extent will not cause the stem 11 to be exposed under any conditions because of the relative telescopic movement of the extension 14 within the nipple unit 10.

Since under many conditions the body 1 will be mounted in various locations within the wall which is generally denoted at A as to the outer surface thereof, it is necessary to provide for concealing of the bonnet 8 over a substantial range. This concealment of the bonnet 8 is primarily from an esthetic standpoint and for that purpose an escutcheon denoted 15 is provided which may be of any external configuration so long as it will enclose and be of sufficient depth to hide the bonnet 8. In the form of the invention now being described, the escutcheon 15 is provided at its upper portion as is viewed in Figure 1 with an enlarged section 16 in which is mounted a suitable set screw 17 adapted to engage the outer surface of the nipple unit 10 and thus maintain the escutcheon 15 in position irrespective of the location of the surface of the wall at A. It will thus be seen that by reason of the fact that the nipple unit 10 is of substantial length that the escutcheon 15 may be positioned within a wide range over the length thereof and maintained in such position by the set screw, and irrespective of the operation of the handle 12 the stem 11 will always be concealed since it is an unplated member and the only exposed parts are plated to provide for a neat appearance. It should be emphasized of course that the surface of the wall at A may be substantially above that shown in the Figure 1 position as a matter of discussion although of course this would be usually outwardly from such wall surface as is commonly the position for mounting such fitting.

In the modification of the parts just described, and shown at the right hand portion of Figure 1 disclosure, a further bonnet 20 is shown, which bonnet has the stuffing box nut 21 threadedly engaged therein. In this instance the stuffing box nut 21 is intended to engage an externally threaded nipple 22 at the lower end of said nipple as viewed in Figure 1, the nipple 22 extending a substantial distance upwardly from said nut 21 irrespective of the amount or number of threads or the nipple 22 which are engaged with the nut 21.

In this particular instance the handle 12 which is identical with the handle 12 previously mentioned is connected to the stem 11 which is identical with that previously mentioned by means of a screw 13 likewise, and the handle 12 is equipped with an extension portion 14 integral therewith which extends into a sleeve 23 of a nipple unit which includes the nipple 22 previously mentioned. The sleeve 23 is threaded throughout its length internally and on its exterior is provided with a suitable plated finish so as to present a neat, pleasing appearance.

The nipple 22 of the nipple unit now being discussed, is intended to engage with a corresponding threaded portion 24 of an escutcheon denoted in this case 25, whereby the escutcheon 25 may be threadedly moved along said nipple for a substantial distance to accommodate for the location of the wall surface at A irrespective of where that surface may be.

In the instance now being discussed, the sleeve 23 likewise engages the nipple 22 of the nipple unit under discussion and at its end 26 comes into contact with the adjacent surface 27 of the escutcheon 25 and locks the said escutcheon with regard to the nipple 22 whereby further rotation of the escutcheon would not take place without properly manipulating the respective parts just mentioned. Thus the escutcheon 25 may be positioned so as to fix its location along the nipple and maintained there by locking movement of the sleeve 23 of the nipple unit now under discussion.

Of course the operation of the handle 12 so as to move the stem 11 in and out of the fixture and control the flow of water through the inlet 3 is similar to that of the handle on the opposite side of the body previously discussed and the extension 14 is of such length as to move inwardly in telescopic fashion in the sleeve 23 and never permit the stem 11 to be exposed.

There have just been described two novel forms of nipple units which, while different, accomplish the same purpose and provide for a wide range of adjustments of escutcheon in its function of concealing the operating parts of a body within a wall and particularly the bonnets of such a valve as is here illustrated.

I claim:

1. In valve stem construction of the class described, in combination, a valve body, bonnet means therefor, a stem extending from said bonnet means, said stem being desirably concealed at its outer portion, and means to conceal said stem and bonnet means when said valve body is installed, said concealing means accommodating such installation over a wide range and comprising a nipple unit connected to the bonnet means and surrounding the stem, said nipple unit consisting of a long threaded member having external threads thereon, and a tubular part having internal threads therein to engage the threads of the long threaded member aforesaid, an escutcheon enclosing said bonnet means and adjustable along said threaded member, said escutcheon having a threaded portion in engagement with the threads of said long threaded member, said tubular part being arranged for movement along the member to engage the escutcheon whereby locking of the escutcheon with respect to the member is effected, and a handle on said stem, said handle having a stem receiving extension within which the stem is concealed for a substantial distance, and constructed whereby said extension is movable inwardly and outwardly with respect to the tubular part aforesaid, said nipple unit likewise constituting further concealing means for said handle extension.

2. In valve stem construction of the class described, in combination, a valve body, bonnet means therefor, a stem extending from said bonnet means, said stem being desirably concealed at its outer portion, and means to conceal said stem and bonnet means when said valve body is installed, said concealing means accommodating such installation over a wide range and consisting of a nipple unit connected to the bonnet means and surrounding the stem, said nipple unit including a long threaded member having external threads thereon, said threads engaging the bonnet unit at one end, said member surrounding said stem, a tubular part having threads engaged with the other end of said member, an escutcheon enclosing said bonnet means and including a threaded portion engaged with the member having external threads thereon, said escutcheon being fixed in position on the member by locking engagement of the tubular member therewith, a handle on said stem, said handle having a stem receiving extension within which the stem is concealed for a substantial distance, and constructed whereby said extension is movable inwardly and outwardly with respect to the tubular part aforesaid, said tubular part constituting further concealing means for said stem, and the handle extension is telescopically arranged with respect to the said tubular part.

References Cited in the file of this patent

UNITED STATES PATENTS

| | | |
|---|---|---|
| 1,639,248 | Zolleis | Aug. 16, 1927 |
| 1,665,436 | Bloch | Apr. 10, 1928 |
| 1,847,917 | Binns | Mar. 1, 1932 |

FOREIGN PATENTS

| | | |
|---|---|---|
| 362,123 | Great Britain | Dec. 3, 1931 |